United States Patent [19]

Ames

[11] Patent Number: 5,442,721
[45] Date of Patent: Aug. 15, 1995

[54] FIBER-OPTIC ROTARY JOINT WITH BUNDLE COLLIMATOR ASSEMBLIES

[75] Inventor: Gregory H. Ames, Gales Ferry, Conn.

[73] Assignee: The United States of America as represented by the Secretary of the Navy, Washington, D.C.

[21] Appl. No.: 287,027

[22] Filed: Aug. 8, 1994

[51] Int. Cl.[6] .............................................. G02B 6/26
[52] U.S. Cl. ........................................ 385/26; 385/35; 385/36
[58] Field of Search ................. 385/25, 26, 20, 21, 385/33, 35, 36

[56] References Cited

U.S. PATENT DOCUMENTS 5,271,076  12/1993  Ames ................................. 385/34

FOREIGN PATENT DOCUMENTS 61-259208  11/1986  Japan ................................. 385/74
63-101805   5/1988  Japan ................................. 385/35

*Primary Examiner*—Rodney B. Bovernick
*Assistant Examiner*—John Ngo
*Attorney, Agent, or Firm*—Michael J. McGowan; Michael F. Oglo; Prithvi C. Lall

[57] ABSTRACT

There is presented a fiber-optic rotary joint with first and second bundle collimator assemblies, the joint comprising a generally cup-shaped main rotor, a first bundle collimator assembly fixed in a central opening in a bottom wall of the main rotor, a generally cup-shaped stator disposed within the main rotor, the stator having a bottom wall opposed to the main rotor bottom wall, and a second bundle collimator assembly disposed in a central opening in the bottom wall of the stator. The joint further includes a prism mounted in a prism rotor in the joint between the first and second collimator assemblies, and gear means for causing rotation of the main rotor at twice the speed of rotation of the prism rotor. Azimuthal adjustment structure is disposed on one of the first and second collimator assemblies for azimuthal alignment of the one collimator assembly with the other of the collimator assemblies.

4 Claims, 3 Drawing Sheets

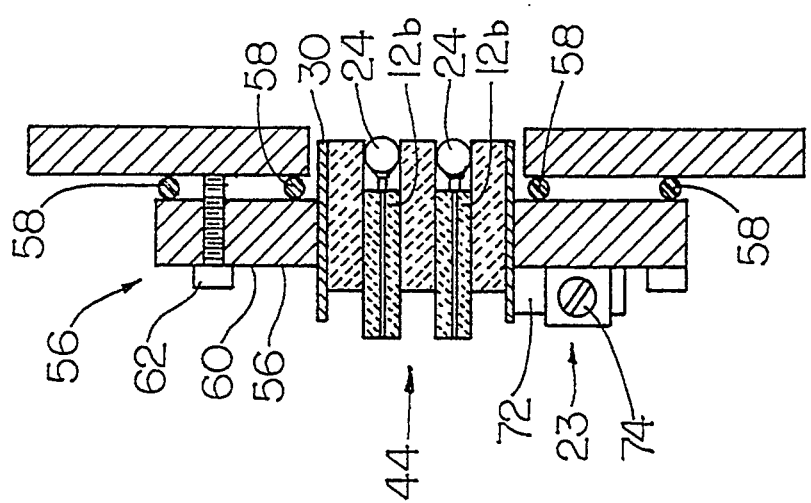
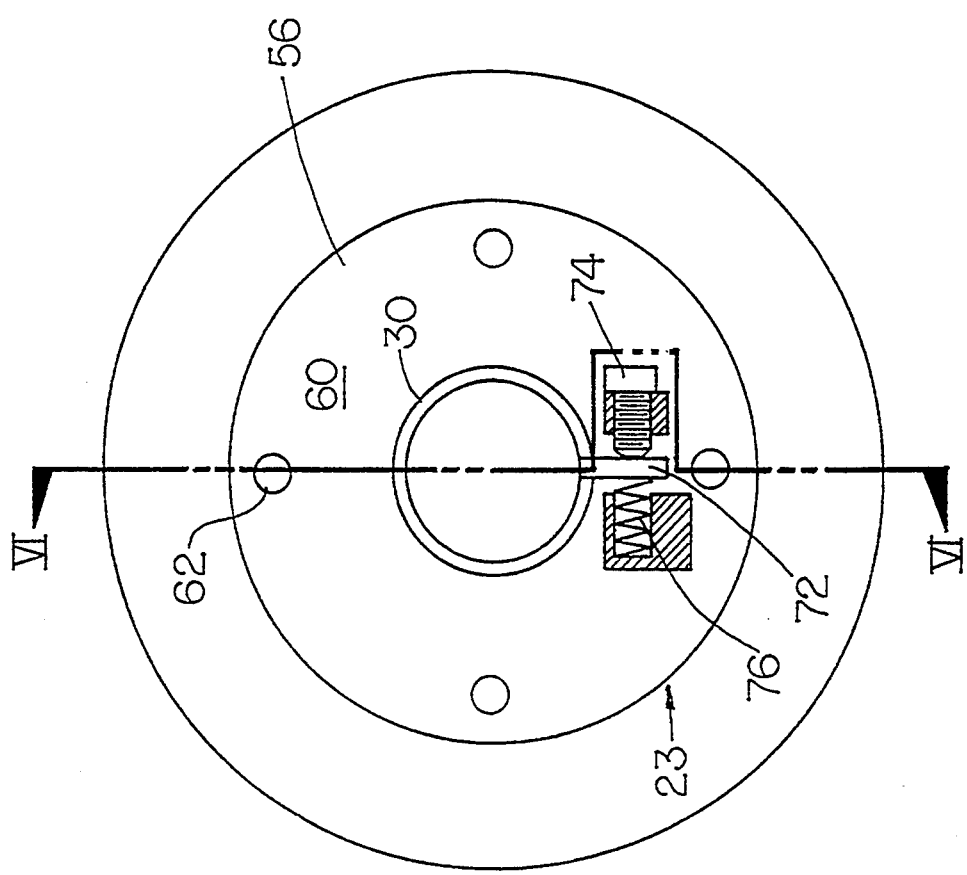

FIBER-OPTIC ROTARY JOINT WITH BUNDLE COLLIMATOR ASSEMBLIES

STATEMENT OF GOVERNMENT INTEREST

The invention described herein may be manufactured and used by or for the Government of the United States of America for governmental purposes without payment of any royalties thereon or therefor.

CROSS-REFERENCE TO RELATED PATENT APPLICATIONS

This patent application is co-pending with two related patent applications entitled Fiber-Optic Bundle and Collimator Assembly (Navy Case 76173), and Assembly Method For Fiber-Optic Bundle Collimator Assemblies (Navy Case 76191).

BACKGROUND OF THE INVENTION (1) Field of the Invention

This invention relates to the coupling of light from a plurality of fiber-optic channels to matching fiber-optic channels, and is directed more particularly to matching of fiberoptic channels across a rotary interface.

(2) Description of the Prior Art

A variety of fiber-optic applications require that multiple fiber channels cross a rotary interface. Previous devices to accomplish this have been based on the principle of prism derotation. Light from an array of optical fibers at one side of the device is collimated into separate beams by lenses near the output of each fiber. The beams pass through a derotation prism which is caused to rotate at half the rotational speed as the input array of fibers. The group of collimated beams at the output is stationary and couples the light into a matched array of fibers and lenses. It is necessary that the input beams be precisely aligned with the output beams. To accomplish such alignment, it has been necessary to individually align the channels. Such alignment has required the input collimated beam of each input optical fiber to be tilted in two orthogonal directions and the output collimated beam of the matching output optical fiber to be similarly tilted in two orthogonal directions.

In the above-referenced application entitled Fiber Optic Bundle and Collimator Assembly (Navy Case 76173), filed concurrently with the present application, there is disclosed a fiber-optic collimator bundle array which provides for collimating beams of multiple fibers into a bundle of separate beams, all of which are precisely co-parallel.

The provision of a fiber-optic collimator bundle array of the type disclosed in the above-referenced copending application (Navy Case 76173) makes practicable the provision of a tilt adjustment mechanism adapted to align an input beam by two tilt adjustments and an output beam by two adjustments. Inasmuch as all of the channels of a bundle are co-parallel, alignment of one of the channels results in alignment of all of the channels. However, in a tilt adjustment device for bundle collimator assemblies, it is further necessary to have facility for azimuthal rotary alignment, as well as tilt alignment.

There is thus a need for a fiber-optic rotary joint with bundle collimator assemblies which provides for simultaneous alignment of all channels and, further, provides for azimuthal alignment of opposed channels.

SUMMARY OF THE INVENTION

An object of the invention is, therefore, to provide a fiber-optic rotary joint with bundle collimator assemblies which facilitates beam coupling of the collimator assemblies by tilting adjustments in two directions for each collimator assembly and by azimuthal alignment of the collimator assemblies.

With the above and other objects in view, as will hereinafter appear, a feature of the present invention is the provision of a fiber-optic rotary joint with first and second bundle collimator assemblies, the joint comprising a generally cup-shaped main rotor, a first bundle collimator assembly fixed in a central opening in a bottom wall of the main rotor, a generally cup-shaped stator disposed within the main rotor, the stator having a bottom wall opposed to the main rotor bottom wall, and a second bundle collimator assembly disposed in a central opening in the bottom wall of the stator. The joint further includes a prism mounted in a prism rotor in the joint between the first and second collimator assemblies, and gear means for causing rotation of the main rotor at twice the speed of rotation of the prism rotor. Azimuthal adjustment structure is disposed on one of the first and second collimator assemblies for azimuthal alignment of the one collimator assembly with the other of the collimator assemblies.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of the invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings:

FIG. 5 is an end view of the rotary joint of FIG. 1; and

FIG. 6 is a sectional view taken along lines VI—VI of FIG. 5 and featuring a second collimator assembly.

DESCRIPTION OF THE PREFERRED EMBODIMENT

Figure 2:
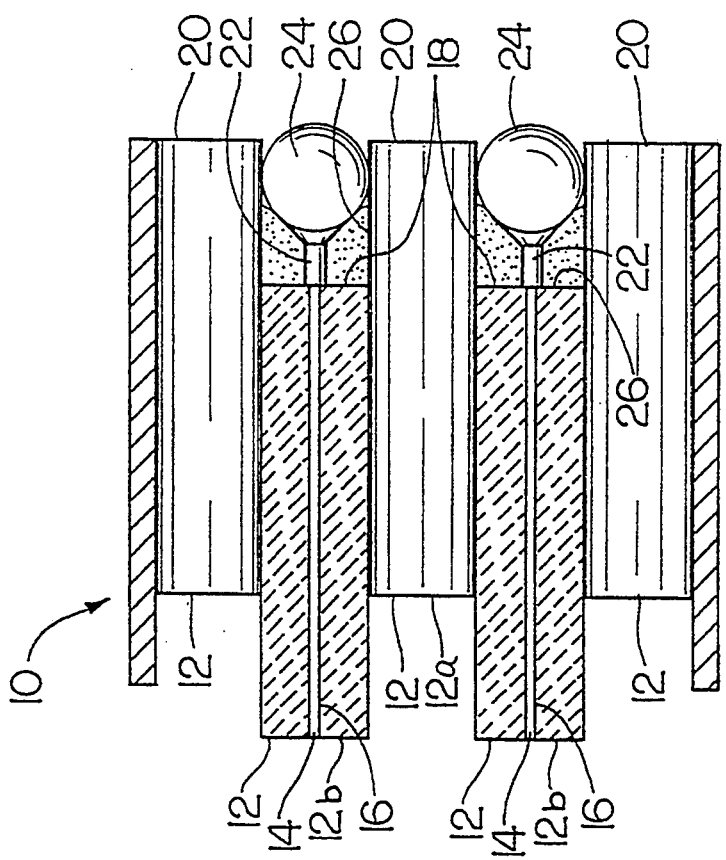
FIG. 2 is a sectional view taken along line II—II of FIG. 1, with spherical optical lenses and some ferrules shown in elevation.
Figure 1:
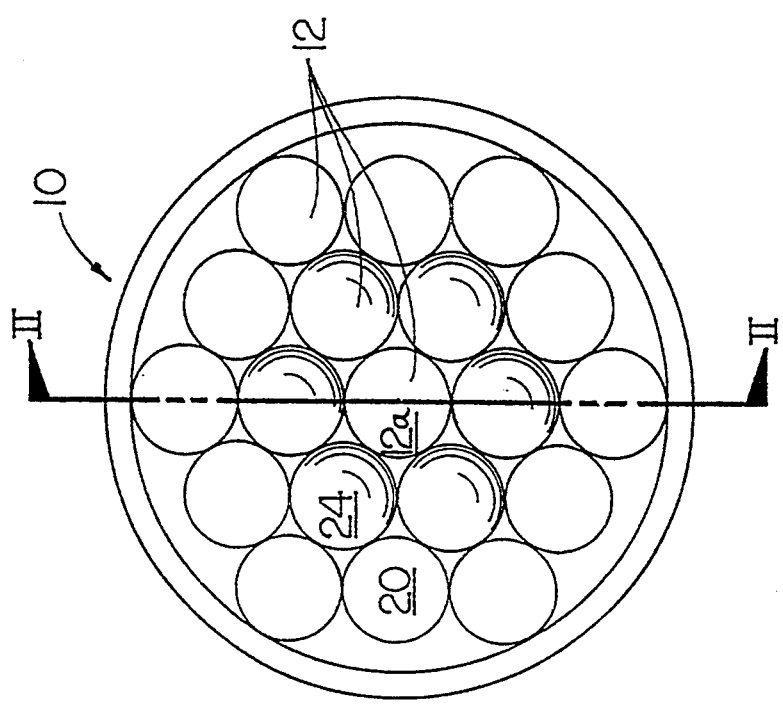
FIG. 1 is an end view of a bundle collimator assembly of the type used in the joint of the present invention.

Referring to FIGS. 1 and 2, there is shown an illustrative fiber-optic bundle collimator 10 of the type used in the present rotary joint. The bundle collimator 10 includes nineteen precision ceramic cylindrical ferrules 12 formed into a hexagonal array. The ferrules are well-known and readily available. Such ferrules are widely used in fiber-optic connectors, are relatively inexpensive, and are manufactured to high accuracy.

In the illustrative bundle collimator 10, the nineteen ferrule array includes a central ferrule 12a and two concentric hexagonal rings of ferrules. The inner ring of six ferrules 12b contains optical fibers 14 which are epoxied into their respective central tubes 16 and the faces 18 of which have been polished. The ferrules 12b are recessed from an assembly face 20. Spacers 22 and spherical optical lenses 24 are inserted in pockets 26 established by the recession of the six ferrules 12b. The spherical lenses 24 may be made from glass or other optically transparent material and are fabricated with tight diameter and roundness tolerances. The spherical lenses 24 are precisely the same diameter as the ferrules 12b. The spacers 22 establish the separation between the fiber face and the spherical lens 24, which separation is critical to providing a correctly collimated beam at the output of the spherical lens. In coupling single-mode optical fiber to single-mode optical fiber, it is known that there is an optimum separation of fiber face and spherical lens which provides the lowest optical coupling loss. Any suitable means of maintaining the arrangement of ferrules, lenses, and spacers may be employed, such as epoxy 28 locking together an outer ring 30 and the above-described inner components.

The nineteen ferrules 12 establish a close-packed hexagonal array which results in a precise location for each ferrule because of the accuracy of their diameters. Because the spherical lenses are precisely the same diameter, they are positioned such that the center of the lens 24 is on the same line defined by the axis of the adjacent recessed ferrule 12b. Because each ferrule has a tight tolerance relative to the concentricity of the outer diameter and inner fiber tube 16, the lens center is on the same axis defined by the optical fiber 14. Any angular defection of the collimated beam which exits the lens 24 relative to the ferrule axis is caused by the lateral displacement of the lens center from the fiber center in directions perpendicular of the axis of the lens center. Because of the precise alignment of lens and fiber, the collimated beam emerges precisely parallel to the ferrule axis. Because all ferrules in the hexagonal array are parallel, all emerging collimated beams are co-parallel. The bundle collimator is described in the aforementioned Navy Case 76193.

In coupling multiple fibers by expanded beam coupling, the output from each fiber 14 is collimated by a lens 24. Each such beam must be aligned to point directly toward the lens 24 and fiber 14 to which it will couple. The second lens and fiber's collimated beam must likewise be pointed at the first. Such alignment is required to achieve maximum coupling of the light from fiber to fiber, and can be accomplished by mounting each fiber/lens assembly on a mechanical assembly providing tilting action in two orthogonal directions. In the prior art, a separate mechanical assembly is provided for each fiber channel in order to provide independent alignment of each pair of fibers.

Figure 3:
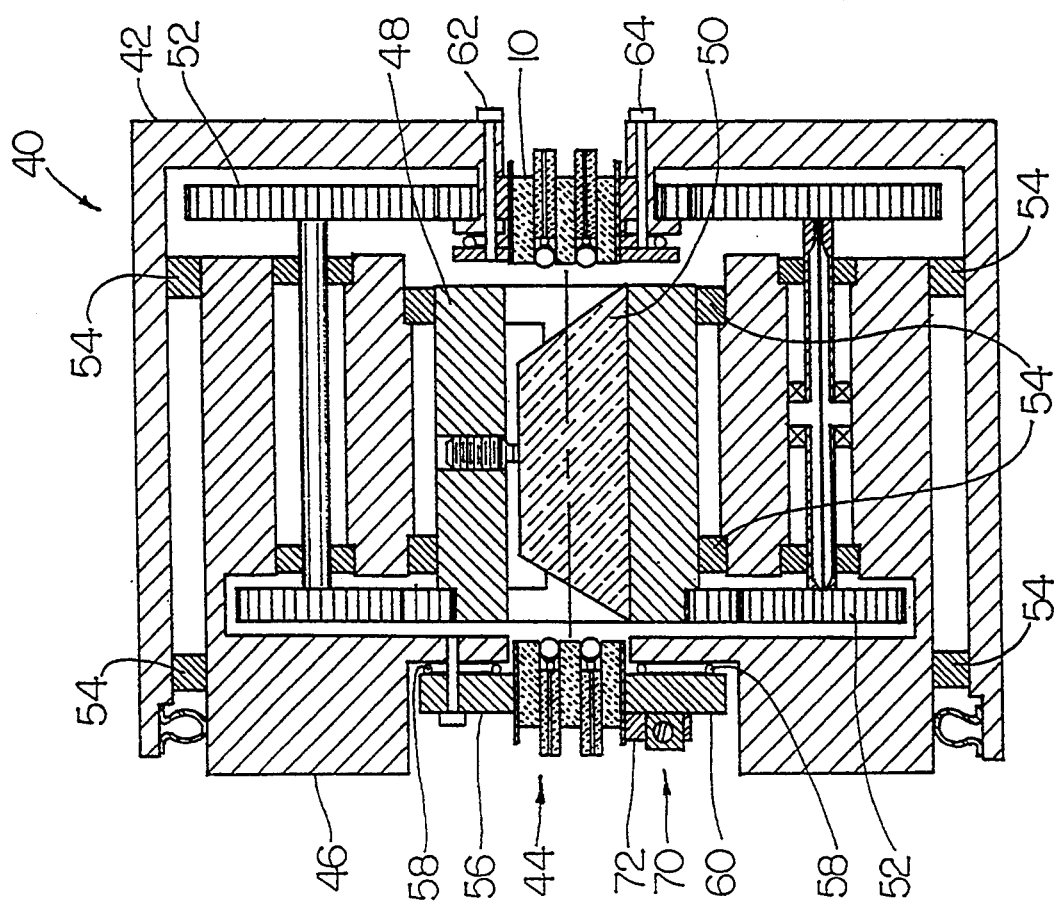
FIG. 3 is a generally sectional view of a rotary joint illustrative of an embodiment of the invention.

An illustrative embodiment of a rotary joint 40 employing the bundle collimator assembly 10 is shown in FIG. 3. The first bundle collimator assembly 10 is part of a generally cup-shaped rotor 42. A second bundle collimator assembly 44 is part of a generally cup-shaped stator 46. A prism rotor 48 holds a derotation prism 50. A two to one gear assembly 52 ensures that the prism rotor 48 rotates half as fast as the main rotor 42, in the same direction. Sets of matched precision ball bearing assemblies 54 maintain precise alignment between the main rotor 42 and stator 46, and maintain alignment of the prism rotor 48 and the stator 46. The bundle collimators 10, 44 are each attached to their respective joint parts by a two axis tilt stage 56. Any tilt stage which provides precision control of tilt in two orthogonal directions may be used.

Figure 4:
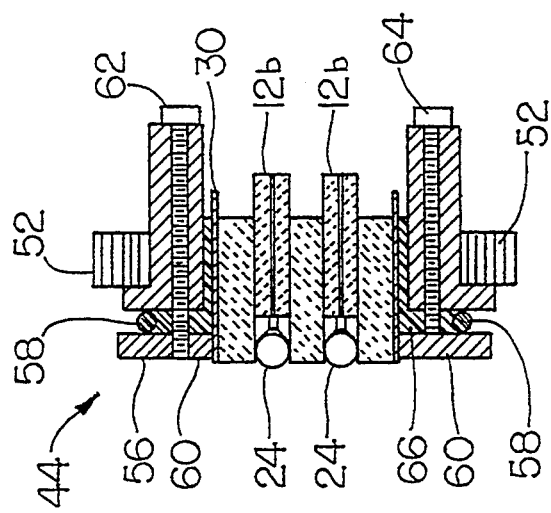
FIG. 4 is an enlarged presentation of a first collimator assembly of FIG. 3.

The embodiment of tilt stage 56 shown in FIGS. 3, 4 and 6 is provided with a resilient o-ring 58 under a plate 60. Screws 62 placed about the periphery of plate 60 can be tightened to displace the plate 60 and compress o-ring 58. Positions of screws 62 ensure that the resulting tilting action of plate 60 and attached bundle collimator assembly 10, 44 is controlled in two orthogonal directions. The fineness of the screw thread and the separation of the adjustment screws 62 determines the resolution of adjustment achieved. Locking screws 64 and/or epoxy 66 lock the tilt mechanism in place once final optical alignment has been achieved.

On one side of the device 40, illustrated in FIGS. 3, 5 and 6 as the stator side, an azimuthal adjustment mechanism 70 is included to adjust the position of the output bundle collimator assembly 44 with respect to the input bundle collimator assembly. An illustrative embodiment of the azimuthal adjustment mechanism is shown in FIGS. 5 and 6. The outer cylindrical ring 30 of the bundle collimator assembly 44 fits snugly, but rotates within the plate 60 of the tilt stage 56. A projection 72 from outer ring 30 of the bundle collimator assembly 44 is contacted by an adjustment screw 74 mounted on the tilt stage 56, such that turning of the screw 74 pushes projection 72 against the pressure of a spring 76, mounted on the tilt stage 56, and rotates the bundle collimator assembly 44. A single azimuthal adjustment rotates one of the collimator bundle assemblies about an imaginary axis connecting the two collimator bundle assemblies.

To align the rotary joint 40 the entire device is first assembled. The two tilt stages 56 are adjusted in both orthogonal directions until light transmission through one channel is maximized. The azimuthal adjustment is then made in conjunction with readjustment of the tilt angles until light transmission through two fibers is maximized. At that point, light transmission through the other channels should also be near maximum. Continued manipulation of all adjustments is undertaken to find a compromise position which gives best performance for all channels.

Thus, there is provided a rotary joint easily adjusted for alignment of a multiplicity of optical fibers. Because the bundle of beams is co-parallel, all fiber channels are aligned simultaneously through a single set of adjustments, rather than each channel being aligned independently. This reduces alignment labor and simplifies the apparatus. It also makes it possible to handle more fiber channels than could otherwise be done. The method of alignment includes use of tilt stages. Because there is only a single tilt stage to a side handling all of the fibers, the tilt stage can have a large dimension transverse to a rotational axis of the invention. The large dimension acts as a moment arm so that motion of the adjustment screws gives a very fine high resolution adjustment of the angle of tilt.

It is to be understood that the present invention is by no means limited to the particular construction herein disclosed and shown in the drawings, but also comprises any modification or equivalents within the scope of the claims. For example, the inventive concept herein finds utility in larger arrays. A hexagonal array with an additional ring of eighteen more ferrules allows an optical channel to be placed in the center position and in each of the twelve positions in the second ring for a total of thirteen fiber-optic channels.

What is claimed is:

1. A fiber-optic rotary joint with first and second bundle collimator assemblies, said joint comprising:

generally cup-shaped main rotor;

a first of said bundle collimator assemblies fixed in a central opening in an end wall of said main rotor;

a generally cup-shaped stator disposed within said main rotor, said stator having an end wall opposed to said main rotor end wall;

a second of said bundle collimator assemblies disposed in a central opening in said end wall of said stator;

a prism mounted in a prism rotor in said joint, said prism being disposed between said first and second bundle collimator assemblies;

gear means for causing rotation of said main rotor at twice the speed of rotation of said prism rotor;

each of said bundle collimator assemblies including a tilt assembly by which its associated bundle collimator assembly may be tilted; and azimuthal adjustment structure disposed on one of said first and second bundle collimator assemblies for azimuthal alignment of said one bundle collimator assembly with the other of said bundle collimator assemblies by rotation of said one bundle collimator assembly relative to said other bundle collimator assembly.

2. The joint in accordance with claim 1 wherein said second bundle collimator assembly is rotatably disposed in said central opening in said end wall of said stator.

3. The joint in accordance with claim 2 wherein said azimuthal adjustment structure comprises a projection extending from said second bundle collimator assembly, such that turning pressure exercised against said projection urges said second bundle collimator assembly to rotate in said stator end wall central opening.

4. The joint in accordance with claim 1 wherein said tilt plate assembly comprises a plate fixed to its associated bundle collimator assembly and disposed around said central opening of one of said rotor and said stator, elastomeric material disposed between said plate and said one of said rotor and said stator, and screws extending through said plate and into said one of said rotor and said stator, such that tightening of a selected one of said screws compresses said elastomeric material and tilts said plate and said associated bundle collimator assembly fixed thereto.

* * * * *